(12) United States Patent
Brodeur, Jr. et al.

(10) Patent No.: US 6,432,551 B1
(45) Date of Patent: *Aug. 13, 2002

(54) DRY ADHESIVE

(75) Inventors: Edouard A. Brodeur, Jr., Marietta; Henry Pete Coke, Cartersville, both of GA (US)

(73) Assignee: Panda Products, Inc., Cartersville, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/472,393

(22) Filed: Dec. 23, 1999

(51) Int. Cl.$^7$ .......................... B32B 27/30; B32B 27/22
(52) U.S. Cl. ........................................ 428/518; 428/520
(58) Field of Search ........................ 428/343, 355 AC, 428/518, 516, 520

(56) References Cited

U.S. PATENT DOCUMENTS

| | | | |
|---|---|---|---|
| 2,873,450 A | | 2/1959 | Brodeur, Jr. |
| 3,765,972 A | * | 10/1973 | Wesp .......................... 156/71 |
| 3,787,259 A | * | 1/1974 | Kleinfeld et al. ............. 156/78 |
| 4,002,702 A | * | 1/1977 | Kuhn ........................ 260/899 |
| 4,510,201 A | * | 4/1985 | Takeuchi et al. ............ 428/285 |
| 5,352,158 A | | 10/1994 | Brodeur, Jr. |
| 5,416,146 A | | 5/1995 | Kushida et al. |
| 5,591,806 A | | 1/1997 | Recchia et al. |
| 5,676,785 A | | 10/1997 | Samonides |
| 5,712,031 A | | 1/1998 | Kelch et al. |
| 5,824,448 A | | 10/1998 | Liu et al. |

* cited by examiner

Primary Examiner—Daniel Zirker
(74) Attorney, Agent, or Firm—Kilpatrick Stockton LLP

(57) ABSTRACT

This composite uses the bonding of PVC to a variety of materials, from cloth to concrete, by the simple laying of the PVC surface to the other surface without the use of conventional wet, tacky, intermediate layer or layers of conventional adhesives. A simple preapplication of a chemical intermediate to the second surface in latex form and dried to a nontacky state is done. This is followed in any length of time thereafter with the simple contact of both surfaces, one to the other. A mild to aggressive tack bond, or a hard permanent joining of both surfaces is achieved. This bond is formed by the polar attraction of certain acrylics to the plasticizers in the PVC.

20 Claims, 1 Drawing Sheet

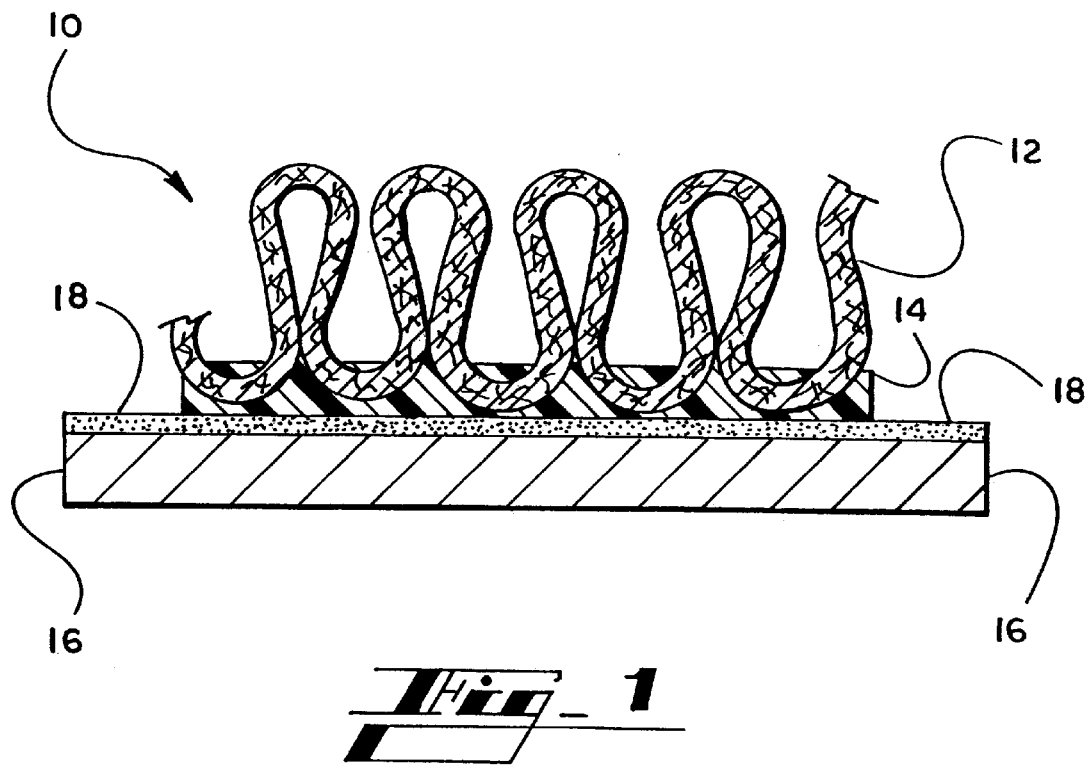
Fig_1
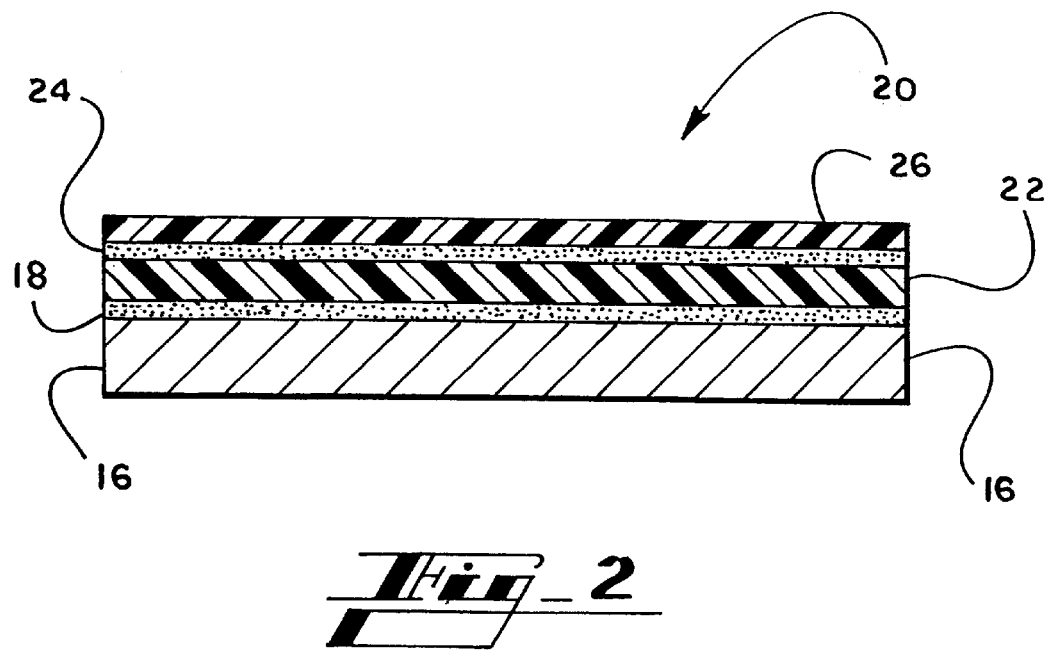
Fig_2

DRY ADHESIVE

TECHNICAL FIELD

This invention relates to a dry adhesive for floor coverings and a process therefor. More specifically, the dry adhesive is an acrylic.

BACKGROUND ART

Polyvinyl chloride (PVC) cast solid and foamed films in varying thicknesses are used for many applications; particularly in the floor covering field. Most notably, these are found in the walk off mat industry, the fatigue mat industry, and the carpet backing industry. Being a true thermoplastic material PVC is characterized by memory and slow recovery to deformation as opposed to true cross-linked polymers like natural rubber and certain polyurethanes. The processing ease, chemical and environmental tolerances, versatility of properties and relative favorable economics make PVC a material of choice wherever possible.

In the normal joining of PVC foams and films to other substrates, the need often arises to post apply, or to delay application of one surface to the other. An example of this would be the installation of PVC backed carpet or carpet tiles over concrete or wood floors, wherein the floor preparation is often done ahead of time. The result is a tacky floor that is out of service. If the floor were to be tack free, then the floor could not only be waled on if needed, but also walked on during application of the PVC backed product. Floor tiles with a PVC back are normally installed by applying a pressure sensitive adhesive to various types of flooring, followed by a waiting period for the adhesive to dry followed by a cumbersome laying out of the tiles. If the adhesive is aggressive, moving and adjusting of the tiles is an obvious problem.

DISCLOSURE OF THE INVENTION

We have discovered that bonding PVC to a variety of materials, from cloth to concrete, is achievable by the simple laying of the PVC surface to the other surface without the use of conventional wet, tacky, intermediate layer or layers of conventional adhesives. A simple pre-application of a chemical intermediate to the second surface in latex form and dried to a nontacky state is done. This is followed in any length of time thereafter with the simple contact of both surfaces, one to the other. A mild to aggressive tack bond, or a hard permanent joining of both surfaces is achieved. This bond is formed by the polar attraction of certain acrylics to the plasticizers in the PVC. This surface to surface migration of the plasticizer can be made to happen rapidly; within hours.

The ability to make changes during installation; the ease with which materials and personnel can move about; are but a few of the advantages of this system. With our invention, the acrylic is applied to the floor by conventional means and methods using half of the amount needed for pressure sensitive adhesives. The thin coating dries within one hour and the floor can be walked on before and during the laying out of the tiles. Since it takes contact and some time, the tiles can be moved and adjusted. This method functions well in conjunction with some contact adhesives to temporarily keep the tiles in place as the bond is formed. Roll goods are easily installed with this technique.

BRIEF DESCRIPTION OF THE DRAWING

FIG. 1 is a cross-sectional view of a floor tile adhered to a floor according to this invention.

FIG. 2 is a cross-sectional view of ceramic tile and foam adhered according to this invention.

BEST MODE OF CARRYING OUT INVENTION

FIG. 1 shows composite 10 comprising tufted fibrous yarn or carpet 12 imbedded into PVC film 14. Flooring is shown as substrate 16. The dry acrylic adhesive is shown as layer 18.

The fibrous material and yarns employed as yarn or carpet 12 may comprise synthetic, natural or a combination of synthetic and natural fibers, such as but not limited to, polyamides like nylon, olefins like polypropylene, wool and wool blends, acrylic, acrylic-nylon blends and polyester yarns and combinations and blends thereof.

Carpet 12 requires a backing layer 14 into which the tufts of yarn are imbedded. In the case of PVC backed mats, the formulation is basically composed of a phthalate plasticizer such as DOP, a PVC resin of unspecified molecular weight and as much inert inexpensive fillers, generally, and not limited to, calcium carbonate as the application will tolerate.

FIG. 2 shows composite 20 illustrating another embodiment of this invention. Flooring is shown as substrate 16. The dry acrylic adhesive is shown as layer 18. Layer 22 is a PVC foam formulation using the polyvinyl chlorides described herein. Layer 24 is a second layer of dry acrylic adhesive and layer 26 is ceramic tile. As discussed herein, adhesive layer 24 is applied to ceramic tile layer 26 and dried before adhering it to PVC foam layer 22.

Our composite comprises in order: a substrate, a dry acrylic adhesive adhered to the substrate; and a plasticized, polyvinyl chloride layer adhered to the dry acrylic adhesive. The dry acrylic adhesive is at least one polymer or copolymer of methyl methacrylate, ethyl acrylate, acrylic acid or acrylic esters. Preferably, the dry acrylic adhesive is at lest one polymer, copolymer or terepolymer of ethyl acrylate, butyl acrylate, styrenated acrylics or acrylonitrile. In a broader sense, the dry adhesive also is an acrylic acid acrylic ester copolymer having the formula

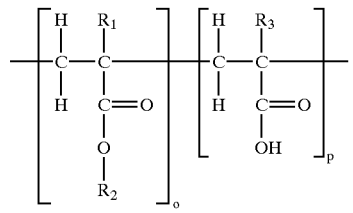

wherein:

$R_1$ is H or $CH_3$ $R_2$ is $CH_3$, $CH_2CH3$, $(CH_2)3CH_3$, n-octyl or 2-ethylhexyl $R_3$ is H, CH3 or COOH o is equal to 4 to 12, and P is equal to 1.

Typically, the substrate is carpet backing, cloth, concrete, wood or flooring.

The vinyl chloride resin to be used for the thermoplastic elastomer composition of the present invention, may be a usual vinyl chloride resin, and it is usual to employ a vinyl chloride resin having an average degree of polymerization of from 700 to 6,000.

The PVC's of this invention also encompass products made of flexible plasticized PVC, usually formulated as a dispersion of high molecular weight PVC resin in a special blend of plasticizers. Both PVC resins and plasticizers are chosen from a vast selection of each to best conform to the needs of the end use. Huge macro molecules of highly ordered PVC pack and interlock to form a rigid polymer. Properly chosen plasticizers will form a stable orientation by virtue of the complex geometry of both the PVC and the plasticizer.

The flexible PVC resins are homopolymers having huge macro molecules of repeated units of vinyl chloride $$(-H_2CCHCl-)_n$$

wherein n is an integer ranging from about 1,000 to about 2,500. The PVC resins of this invention have a K value of at least 75 and preferably ranges from 75 to 100. Molecular weight as used throughout this specification means weight average molecular weight. "K value" is a universal measure of molecular weight. K values above 75 are considered high; K values below 65 are considered low.

As to the plasticizer, there is no particular restriction. Any plasticizer may be employed so long as it is useful for the production of a plasticized vinyl chloride resin product. For example, it may be a plasticizer of a phthalic acid ester type, a trimellitic acid ester type, a pyromellitic acid ester type, an aliphatic dibasic acid ester type, a glycol ester type, a fatty acid ester type, a phosphoric acid ester type or a citric acid ester type. Further it may be an epoxy type plasticizer or polyester type plasticizer.

The amount of the plasticizer is from 25 to 200 parts by weight relative to 100 parts by weight of the vinyl chloride resin. If the amount is less than 25 parts by weight, the processability tends to be poor and the product tends to be too hard, thus failing to present the characteristics as an elastomer. On the other hand, if it exceeds 200 parts by weight, the physical properties tend to deteriorate to a practically useless level.

Regarding the flexible PVC, however, we prefer to replace all or part of the plasticizer by a less aromatic molecule, such as an adipate structure, enhances the resiliency of the PVC. Coupling these with a high molecular weight PVC, further enhances resiliency.

The adipate structures are dibasic aliphatic acids plasticizer construction having the formula:

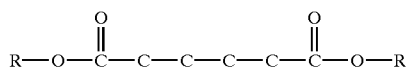

The "R" in the case is a linear or branched alkyl group having 6 to 11 carbon atoms. The structure of this molecule permits closer proximity of the polar sites of the plasticizer to the polar sites of the corresponding PVC resin. Examples of esters of dibasic aliphatic acids include dioctyl adipate, diisodecyl adipate, dioctyl azelate and dioctyl sebacate. Annealing stabilizes this orientation.

Examples of phthalic diesters include esters of phthalic acid with one or two $C_4$ to $C_{12}$ alcohols, for example dioctyl phthalate, diisooctyl phthalate, diisononyl phthalate, diisodecyl phthalate, diisoundecyl phthalate, butyl benzyl phthalate and octyl benzyl phthalate.

The molecular weight of the plasticizers range from 300 to 500 in most cases. Molecular weight as used herein means weight average molecular weight.

We have found that virtually any surface coated with certain acrylic latexes that dry to a tack free finish results in a condition that will accept the migration of a small amount of plasticizer from a VINYL film, foam or VINYL coated product. Either a strong permanent bond; or a weak temporary bond; or a pressure sensitive type bond is formed. This bond is formed by the mere contact of one surface with the other. This bond is formed rapidly; within hours; or slowly depending upon the acrylic formulation as well as the absence or presence of heat.

We have found that coatings based upon ethyl acrylate, butyl acrylates and styrene acrylics develop a bond within two to three hours. We have found that coatings based upon vinyl acetate and butyl acrylate either cross linked or partially cross linked do not tend to promote plasticizer migration sufficiently to result in enough dipole attraction between both surfaces for, what would appear to be, an electrostatic bond formation. We have found that ethyl acrylate, butyl acrylate acrylonitrile terepolymers also perform in like manner.

While we have not investigated all available acrylic latexes, solutions or emulsions, we have seen enough to establish that all acrylic homopolymers, most copolymers, and most crosslinked variations of these will cause phthalate, adipate, phosphate ester vinyl plasticizers to migrate from the PVC to the acrylic to a greater or lesser degree.

The following examples further illustrate the invention.

EXAMPLE I

We have adhered carpet tiles to wood or concrete by coating these substrates with Rhom & Haas RHOPLEX* acrylic 261; MV 23* acrylic; and E330* acrylic or GLIDDEN's exterior acrylic paint. We then dried these coatings at room temperature for two hours and layered tiles over the substrate overnight. A firm bond resulted.

The tile backing formulations were as follows:

| Occidental Homopolymer Resin | |
|---|---:|
| Oxy 654° (K Value 70) PVC | 60 Parts |
| Colorite Blending PVC Copol. #521° PVC | 40 Parts |
| Calcium Oxide Desicant | 2 Parts |
| Calcium Carbonate Filler | 200 Parts |
| Dioctyl Phthalate | 100 Parts |
| Color | 2 Parts |

In this example, we could use a homopolymer or a copolymer PVC resin from a K value of 62 up to 80. The adhesion would develop without the incorporation of a blending resin. The filler level can be from zero to 250 parts; and the DOP level may range from 25 parts to 150 parts.

EXAMPLE II

We have adhered ceramic tiles to PVC foam in the following manner. The roller applied a thin film of RHOPLEX MV-23* acrylic to the back of ceramic tile squares at the rate of 100 square feet/gallon and allowed these to dry overnight We applied the RHOPLEX* acrylic to dry for two hours. We then laid down a ⅛ inch layer of chemically blown PVC foam to the floor and immediately started to install the tile squares over the foam layer. The next morning, we had a cushion ceramic tile floor ready for grouting with a flexible urethane mastic type grout.

The formula for the foam cushioning is as follows:

| | |
|---|---|
| Oxy Chemical 67SF° PVC foam resin | 100 Parts |
| Azodicarbonamide nitrogen releasing blowing agent | 3 parts |
| 18% Zinc octoate blowing agent promoter | 1 Part |
| Di Octyl Phthalate (DOP) | 80 Parts |
| Calcium Carbonate | 20 Parts |

This formula will produce a closed cell vinyl foam with a density of 18–20 pounds per cubic foot. This foam can be produced by any method common to the trade such as but not limited to casting wet plastisol on a stainless steel or Teflon coated fiberglass belt then heating the cast film to 375 to 390° F. A large number of PVC resins are available for this application and all of these would be laminateable with this process. Other blowing agents such as the sulfonylhydrazides and the urea based blowing agents have been used, but the preferred agent for this application was azodicarbonamide. The preferred plasticizers are diester phthalates in the range of 50 to 120 parts per 100 parts of PVC.

The lamination of PVC foams or solid films to other materials can easily be accomplished by simply layering the two together overnight by stacking many of these plied products one over the other on a table, a pallet or simply on the floor. A foam backed walk off mat is easily done this way. This is not easily done with walk off mat production methods in use at this time.

There are many applications for sport surfaces that could benefit from such a process. The easy assembly of light weight materials random applied on site and free of definite problematic seams has great advantages over current methods.

Place mats, shelf liners, mouse pads are examples where difficult to bond surfaces and unlike surfaces can easily be bonded with this technology.

Our preferred adhesive for this system is RHOPLEX MV-23* acrylic applied at the rate of 400 square feet per gallon.

Another preferred example is the easy lamination of a foam vinyl backing to carpeting wherein the carpeting is precoated with any preferred backing system chosen for economic considerations, fire retardant considerations, or fiber lock considerations. The precoat is coated with 1 to 3 ounces per square yarn of RHODPLEX MV23˙or E330˙acrylic. The preformed foam is laminated to the precoated carpet by simply rolling the carpet and the foam together. The bond forms in the roll as both surfaces are in intimate contact with one another.

While not ignoring other applications, I have used the areas of launderable walk off mats and fatigue mats to illustrate the broad applications of this invention. Many more areas of use are known where the superior overall properties of PVC enhanced by elastic nature of rubber is of value. A few of these are sport surfaces, aerobic mats, special industrial gasketing, carpet underlays, foamed back commercial carpet, foamed back carpet tiles and foamed back resilient flooring.

Although the now preferred embodiments of the invention have been set forth, it will be apparent to those skilled in the art that various changes and modifications may be made thereto without departing from the spirit and scope of the invention as set forth in the following claims.

We claim:

1. A composite comprising:
   a surface;
   a chemical intermediate applied to the surface in a latex form and dried to a non-tacky state; and
   a polyvinyl chloride surface adhered to the chemical intermediate;
   wherein the chemical intermediate includes at least one acrylic and the polyvinyl chloride surface includes at least one plasticizer and the polyvinyl chloride surface is adhered to the chemical intermediate by a bond formed by polar attraction of the at least one acrylic to the at least one plasticizer.

2. The composite of claim 1, wherein the chemical intermediate is at least one polymer, copolymer or terepolymer selected from methyl methacrylate, ethyl acrylate, butyl acrylate, styrenated acrylics, acrylic acid, acrylic esters and acrylonitrile.

3. The composite of claim 1, wherein the chemical intermediate is an acrylic latex.

4. The composite of claim 1, wherein the chemical intermediate is an acrylic acid-acrylic ester copolymer.

5. The composite of claim 1, wherein the surface is selected from carpet backing, cloth, concrete, wood and flooring.

6. The composite of claim 1, wherein the polyvinyl chloride surface is a floor covering layer.

7. The composite of claim 6, wherein the floor covering layer comprises a vinyl layer.

8. The composite of claim 1, wherein the polyvinyl chloride is represented by the formula $(-H_2CCHCl-)_n$, wherein n is an integer ranging from about 1000 to about 2500.

9. The composite of claim 1, wherein the at least one plasticizer comprises at least one plasticizer selected from a phthalic diester plasticizer and an adipate plasticizer.

10. The composite of claim 1, wherein the polyvinyl chloride comprises a blend of polyvinyl chloride homopolymers and polyvinyl chloride copolymers.

11. A composite comprising:
    a surface;
    a first chemical intermediate applied to the surface in a latex form and dried to a non-tacky state;
    a ceramic tile;
    a second chemical intermediate applied to the ceramic tile in a latex form and dried to a non-tacky state; and
    a polyvinyl chloride layer between the first chemical intermediate and the second chemical intermediate and adhered to both the first chemical intermediate and the second chemical intermediate;
    wherein each of the first chemical intermediate and the second chemical intermediate includes at least one acrylic and the polyvinyl chloride layer includes at least one plasticizer;
    further wherein the polyvinyl chloride layer is adhered to the first chemical intermediate and the second chemical intermediate by a bond formed by polar attraction of the at least one acrylic in each of the first chemical intermediate and the second chemical intermediate to the at least one plasticizer.

12. The composite of claim 11, wherein the polyvinyl chloride layer comprises a polyvinyl chloride foam.

13. The composite of claim 11, wherein each of the first chemical intermediate and the second chemical intermediate are at least one polymer, copolymer or terepolymer selected from methyl methacrylate, ethyl acrylate, butyl acrylate, styrenated acrylics, acrylic acid, acrylic esters and acrylonitrile.

14. The composite of claim 11, wherein at least one of the first chemical intermediate and the second chemical intermediate comprises an acrylic latex.

15. The composite of claim 11, wherein at least one of the first chemical intermediate and the second chemical intermediate comprises an acrylic acid-acrylic ester copolymer.

16. The composite of claim 11, wherein the surface is selected from carpet backing, cloth, concrete, wood and flooring.

17. The composite of claim 11, wherein the polyvinyl chloride surface is a floor covering layer.

18. The composite of claim 17, wherein the floor covering layer comprises a vinyl layer.

19. The composite of claim 11, wherein the at least one plasticizer comprises at least one plasticizer selected from a phthalic diester plasticizer and an adipate plasticizer.

20. The composite of claim 11, wherein the polyvinyl chloride comprises a blend of polyvinyl chloride homopolymers and polyvinyl chloride copolymers.

* * * * *